April 5, 1927.

R. A. TEEL

FLEXIBLE COUPLING

Filed July 24, 1925

R. A. Teel
INVENTOR

BY Victor J. Evans
ATTORNEY

WITNESS:

April 5, 1927.
R. A. TEEL
FLEXIBLE COUPLING
Filed July 24, 1925  2 Sheets-Sheet 2
1,623,857
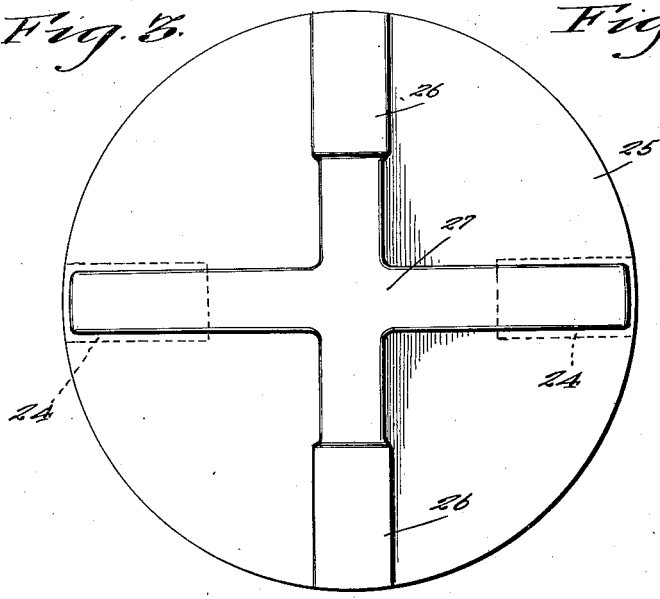
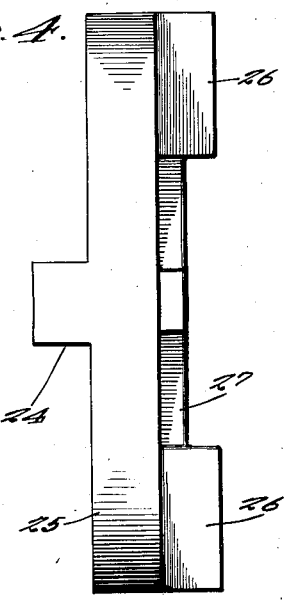
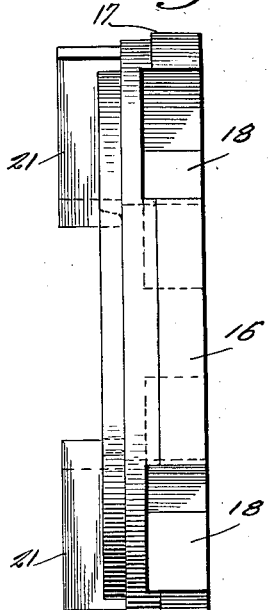
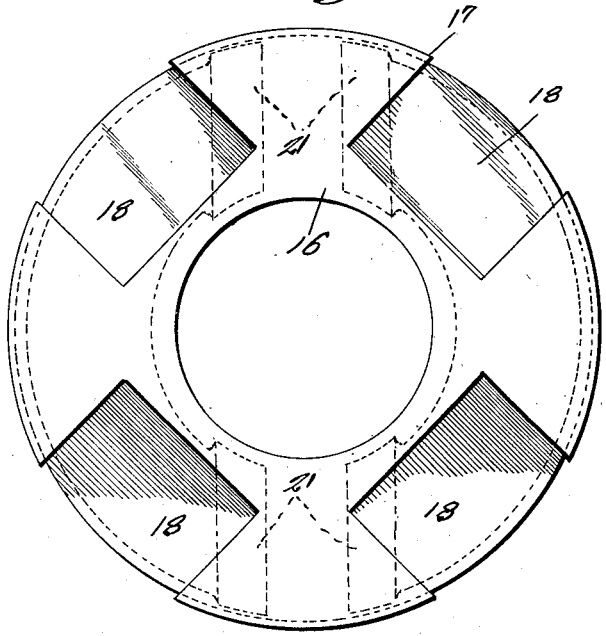
R. A. Teel INVENTOR
BY *Victor J. Evans*
ATTORNEY
WITNESS:

Patented Apr. 5, 1927.

1,623,857

UNITED STATES PATENT OFFICE.

RAYMOND A. TEEL, OF EAST BANGOR, PENNSYLVANIA.

FLEXIBLE COUPLING.

Application filed July 24, 1925. Serial No. 45,912.

This invention relates to coupling devices and has for its object the provision of a novel device by means of which power or other shafts may be flexibly connected whereby to correct angular misalinement, parallel misalinement and to take up the float or end play as well as cushioning any shock in the direction of rotation of the shafts.

An important object is the provision of a coupling of this character embodying a plurality of members certain of which are rigidly secured to the adjacent ends of shafts to be connected and others of which have an operative or drive connection while so arranged as to permit relative movement transversely of the longitudinal axis of the shafts for correcting or compensating for parallel or angular misalinement.

Another object is the provision of a device of this character in which the construction, arrangement and combination of parts are such as to cushion the starting torque and prevent strain upon either of the shafts connected thereby as for instance when power is applied to a previously stationary element to be driven.

Yet another object is the provision of a coupling of this character in which all the parts are enclosed within a casing or shell of such formation as to be capable of being filled with grease for insuring thorough and constant lubrication, means being provided for preventing escape of the grease and the entrance of grit, dust or other foreign matter.

An additional object is the provision of a coupling of this character which will be simple and inexpensive in manufacture, easy to assemble and install, positive in action, efficient and durable in service and a general improvement in the art.

With the above and other objects and advantages in view, the invention may consist in the construction, combination and arrangement of parts as well as the details to be hereinafter more fully described and claimed, and illustrated in the accompany drawings, in which:

Figure 3 is an elevation looking at one side of the floating disk.

Figure 4 is a detail side elevation thereof.

Figure 5 is a front elevation or face view of the other disk, and

Figure 6 is a side elevation thereof.

Figure 1:
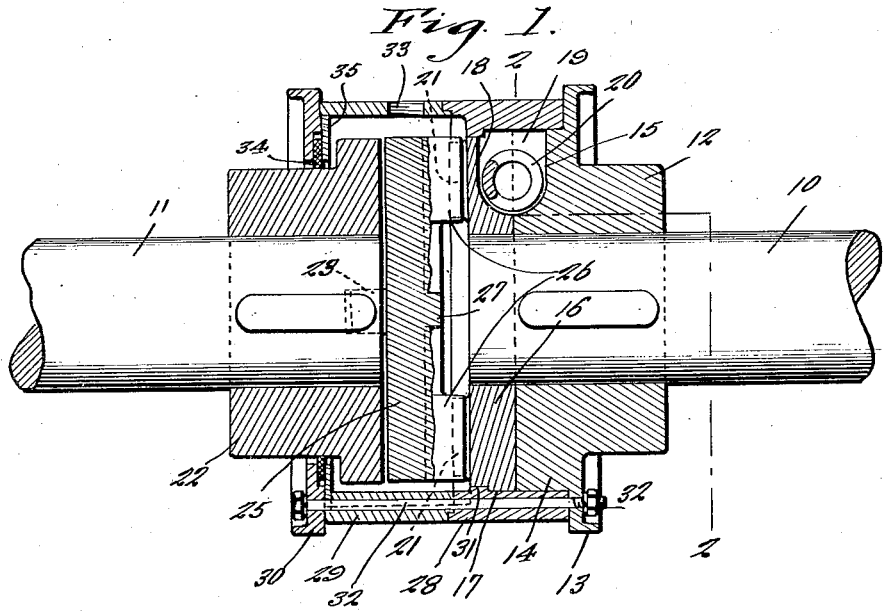
Figure 1 is a longitudinal section through the device, the view being taken on the line 1—1 of Figure 2.
Figure 2:
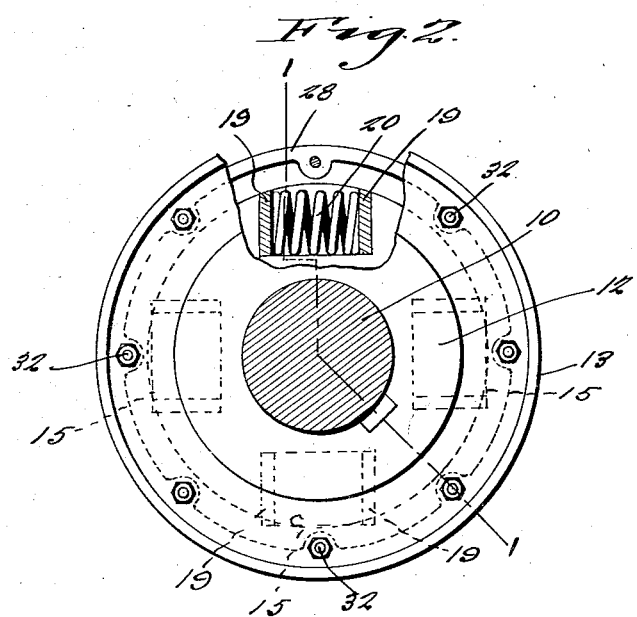
Figure 2 is a cross section taken on substantially the line 2—2 of Figure 1.

Referring more particularly to the drawings, the numerals 10 and 11 designate a pair of drive shafts which it is desired to connect whereby power may be transmitted from one to the other. Keyed or otherwise fixedly secured upon the shaft 10 is a hub member 12 having an outstanding flange 13 and a somewhat reduced portion 14 formed at intervals with pockets 15.

Rotatably mounted upon the shaft 10 is a disk 16 formed with an outstanding flange 17 at its outer periphery and having one face formed with pockets 18 arranged opposite to and mating with the pockets 15. Located within these registering pockets are followers 19 between which are mounted coil springs 20 which constitute a driving connection between the hub member 12 and the disk 16 while permitting a certain amount of yielding to take up the shock of starting. At the opposite sides of the disk 16 are pairs of spaced ribs 21 for a purpose to be described.

Keyed or otherwise fixedly secured upon the shaft 11 is a hub member 22. The face of this hub member toward the hub member 12 is formed with grooves or slots 23 within which fit ribs 24 formed on one face of the floating disk 25 which has its outer face provided with ribs 26 fitting between the pairs of ribs 21 on the disk 16. If desired, the second mentioned face of the disk 25 may be reinforced by means of intersecting webs 27 located between the ribs 26.

The parts above described are surrounded by a shell or casing which includes a pair of cylindrical sections 28 and 29 together with a ring 30. The section 28 engages upon the periphery of the reduced portion 14 of the hub member 12 in abutting relation to the outstanding flange 13 and it also bears upon the periphery of the outstanding flange 17 of the ring member 16. The section 28 has an inwardly projecting shoulder or flange 31 which engages against the edge of the outstanding flange 17 for the purpose of holding the disk member 16 firmly against the adjacent face of the hub member 12. The confronting edges of the sections 28 and 29 are stepped and put together as clearly indicated in Figure 1. The ring member 30 is arranged in encircling relation to the hub member 22 and abuts against the adjacent edge of the section 29. The parts or sections of the casing or shell are held together by means of a plurality of bolts 32 which pass through the flange 13, the sections 28 and 29, and also through the ring 30.

The space within the shell or casing is intended to be filled with grease or other suitable lubricant which may be introduced through an opening 33 formed in the section 29, which opening is of course normally closed by means of a suitable plug or cap. In order to prevent the escape of the lubricant I provide a flexible gasket 34 located against the inner face of the ring member 30 and held thereto by means of an inwardly extending flange 35 formed on the shell section 29.

In the operation of the device, it will be readily apparent that the starting torque is taken up by means of the springs 20 located within the pocket members, these springs also serving to provide the necessary driving connections between the hub member 12 and the disk 16. Owing to the engagement of the ribs 21 on the disk 16 with the ribs 26 on the floating ring 25 and the engagement of the ribs 24 on the disk 25 within the slots or grooves 23 in the hub member 22, it is quite evident that all the parts will be locked together for rotation. At the same time it is apparent that the connection between these various elements is such that in case of misalinement of the shaft either in parallel or in angular relation there will still be an adequate drive connection so that there will be no disruption or breakage of any of the parts.

From the foregoing description and a study of the drawings, it is believed that the construction, operation and advantages will be readily apparent to one skilled in the art without further elaboration.

While I have shown and described the preferred embodiment of the invention, it should of course be understood that I reserve the right to make such changes in the form, construction, and arrangement of parts as will not depart from the spirit of the invention or the scope of the subjoined claim.

Having thus described the invention, I claim:

In a coupling device of the character described, the combination with a pair of shafts arranged in spaced end to end relation, of a hub member mounted upon one shaft and formed with a plurality of radially extending pockets, a disk loosely mounted upon said same shaft in contacting relation to the hub member thereon, and formed with pockets corresponding to said first named pockets, coil springs located within said corresponding pockets and having their ends abutting against the opposed walls thereof, said hub member having its face toward the opposite shaft provided with a plurality of pairs of radially extending ribs, a hub member secured upon the other shaft and having its face toward the first mentioned shaft formed with a plurality of radially extending grooves, and a floating disk member located between the ends of said shaft and provided at one face with a plurality of radially extending ribs engaged between said pairs of first named ribs, said disk being provided at its other face with a plurality of ribs engaged within said grooves.

In testimony whereof I affix my signature.

RAYMOND A. TEEL.